Patented Nov. 23, 1937

2,099,773

UNITED STATES PATENT OFFICE 2,099,773

PREPARATION OF TETRAALKYL THIURAM MONOSULPHIDES

Norman C. Somers, Carneys Point, N. J., assignor to E. I. du Pont de Nemours & Company, Wilmington, Del., a corporation of Delaware No Drawing. Application May 2, 1933, Serial No. 668,983

3 Claims. (Cl. 260—123)

This invention relates to the preparation of organic sulphur compounds from dithio acids and particularly to a modification of processes such as have been described in Patent 1,788,632, granted to D. H. Powers.

Powers, in his patent, discloses that, when cyanogen halides react in aqueous solution with the salts of certain thio acids, the corresponding sulphur compounds are produced in substantially quantitative yields. I have found this to be true when the reaction is carried out on a laboratory scale. However, when this process is attempted to be employed in commercial practice on a large scale, it has been found that the relatively insoluble sulphur compounds separate from the solution in the form of relatively large particles which tend to occlude more or less unreacted material. This results in a lower yield of more impure product. In most cases, the resulting product requires recrystallization or purification by other means to render it marketable. The purification of this product has been found to be exceedingly troublesome and expensive.

An object of the present invention is to improve the process disclosed in Patent 1,788,632. A further object is to provide a process for producing compounds of the type disclosed in the aforementioned patent which process will enable the production of such compounds in higher yields of greater purity. A still further object is to provide a method whereby such products may be obtained in such purity that further purification is unnecessary to render them marketable. Other objects are to advance the art. Still other objects will appear hereinafter.

These objects may be accomplished in accordance with my invention which comprises adding to the aqueous solution of an N-dialkyl-dithiocarbamic acid or its salt, prior to the addition of the cyanogen halide, a suitable amount of a dispersing agent that is stable in alkaline solution. This will cause the sulphur derivative formed to separate as a suspension of fine particles which mechanically occlude practically no unreacted material. This results in substantially quantitative yields of a product of very high purity even when the process is carried out on a large scale such as will be ordinarily desired in commercial practice. Thus, if the theoretical amount of cyanogen chloride is added to a well agitated aqueous solution of sodium dimethyl dithiocarbamate in the absence of a dispersing agent, the tetramethyl thiuram monosulphide, after separation from the solution by filtering, washing with water and drying, will amount to 80-90% of the theoretical yield and will melt at from 100-103° C. Also, such product must be purified before it is marketable. However, if 0.1% of triethanol amine oleate, based on the monosulphide to be made, is added to the aqueous solution of the alkali dithiocarbamate and the reaction is then carried out as before, a 95% yield of a product melting at 107-108° C. will be produced. Such product is marketable without further purification.

The thio acids and their salts, which are to be treated in accordance with my invention, comprise the N-dialkyl-dithiocarbamic acids. The salts of these acids, which are preferably employed, may generally be represented by the formula:

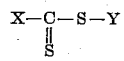

Where X=R₂N— for dithio carbamic acids
R represents an aliphatic or aromatic hydrocarbon group, and
Y represents a basic salt forming residue or alkali metal such as sodium, potassium and ammonium.

The cyanogen halide, when employed, may be one of the group comprising cyanogen chloride, cyanogen bromide and cyanogen iodide.

Among the dispersing agents, which may be employed and which I have found to be particularly satisfactory, are the alkali soaps, such as sodium, potassium and triethanolamine salts of oleic, stearic, palmitic and the like acids; casein, particularly in the form of sodium caseinate and wetting and dispersing agents, such as the alkylated aromatic sulphonates particularly alkylated naphthalene sulphonate or sodium isopropyl naphthalene sulphonate. Other similar dispersing agents, which are stable in alkali solution, may be employed, if desired. The proportions of dispersing agent to be employed will be based upon the amount of product to be formed and varies with the nature of the dispersing agent employed. For example, I have found it to be convenient to employ from about .5 to 2% of casein or, when soaps are employed, to employ from about 0.05% to 1.5% of them. Higher proportions have proved to be satisfactory in practice. It will be obvious that larger and in some cases smaller amounts may be employed, depending on the desire of the user.

In order to more clearly illustrate my invention and the preferred mode of carrying the same into effect, the following examples are given:

Example 1

137 pounds of sodium dimethyl dithio carbamate are dissolved in 548 pounds of water in which has been dissolved 0.1 pound of triethanolamine oleate. This solution is agitated between 40° C. and 50° C. while gaseous cyanogen chloride is added beneath the surface. When 30 pounds of cyanogen chloride have been absorbed, the flow of gas is stopped and the resulting slurry is filtered. The cake of tetra methyl thiuram monosulphide is then washed with water and dried.

Example 2

One hundred and sixty pounds of potassium ethyl xanthate are dissolved in forty gallons of water containing, in solution, one pound of casein as sodium caseinate. Thirty pounds of liquid cyanogen chloride are slowly added to this mixture with vigorous agitation. When reaction is complete, the yellow product, separating as very fine crystals, is filtered and dried.

Example 3

One hundred and sixty pounds of sodium ethyl tri thio carbonate are dissolved in water containing, in solution, one pound of sodium oleate. Fifty pounds of molten cyanogen bromide are added with violent agitation. The finely divided product separates and may be filtered off and dried in vacuo.

Example 4

Four hundred and twenty-five pounds of sodium phenyl methyl dithio carbamate are dissolved in seventy-five gallons of water containing, in solution, two pounds of sodium oleate. Sixty-two pounds of cyanogen chloride, dissolved in one hundred and fifty gallons of water are added with good agitation, allowing the temperature to rise. A very finely divided diphenyl dimethyl thiuram monosulphide separates in a very pure form.

While sodium and potassium salts have been employed in the above examples, other salts may be employed such as those of calcium, zinc, ammonium or other basic salt forming elements which readily form halides that are stable in water solution. Also, salts of thio acids may be employed which may produce liquid reaction products such as tetra ethyl thiuram monosulphide. It will be apparent that the temperature required to cause the reaction to take place with maximum efficiency will vary with different products but will usually be less than 100° C.

While I have disclosed preferred embodiments of my invention, it will be readily understood by those skilled in the art that many variations and modifications may be made in the ingredients, proportions thereof and conditions employed without departing from the spirit of my invention. Accordingly, the scope of my invention is to be limited solely by the appended claims construed as broadly as is permissible in view of the prior art.

In the claims below, the term "organic thio acid" is meant to refer generically to organic compounds including in their structure the grouping

and includes in particular alkyl and aryl dithiocarboxylic acids, trithiocarbonic acids, dithiocarbonic acids (xanthates) and dithiocarbamic acids.

I claim:

1. The process which comprises passing gaseous cyanogen chloride into an aqueous solution of substantially 137 parts of sodium-dimethyl-dithio-carbamate and 0.1 part of triethanolamine-oleate in between 500 and 600 parts of water, while maintaining the reaction mass at between 40° and 50° C., continuing the operation until 30 parts of cyanogen chloride have been absorbed, and recovering the tetra-methyl-thiuram-monosulphide thus formed.

2. In the process of reacting sodium dimethyl-dithio-carbamate and cyanogen chloride in aqueous solution, the improvement which comprises carrying out the reaction in the presence of 0.05 to 1.5%, based on the weight of the product to be formed, of triethanolamine oleate.

3. In the process of reacting a water soluble salt of an N-dialkyl-dithiocarbamic acid and a cyanogen halide, in aqueous solution, the improvement which comprises carrying out the reaction in the presence of 0.05 to 1.5%, based on the weight of the product to be formed, of triethanolamine oleate.

NORMAN C. SOMERS.